United States Patent [19]

Deeks

[11] 4,056,117
[45] Nov. 1, 1977

[54] BOTTOM OUTLET SAFETY CLOSURE

[75] Inventor: Ronald George Deeks, Oakville, Canada

[73] Assignee: Procor Limited, Oakville, Canada

[21] Appl. No.: 738,937

[22] Filed: Nov. 4, 1976

[51] Int. Cl.² .............................................. F16K 17/40
[52] U.S. Cl. ................................ 137/68 R; 105/358; 137/614.05; 214/83.28; 251/144
[58] Field of Search ............ 137/68 R, 69, 71, 614.05; 222/481; 214/83.28; 302/52; 105/358, 360; 251/144

[56] References Cited

U.S. PATENT DOCUMENTS

| 841,095 | 1/1907 | Osborne | 137/68 R |
| 1,698,616 | 1/1929 | Woodham | 137/71 X |
| 2,765,801 | 10/1956 | Selim | 137/71 |
| 3,026,070 | 3/1962 | Sutton et al. | 137/68 R X |
| 3,403,943 | 10/1968 | Stine et al. | 302/52 |

Primary Examiner—Martin P. Schwadron
Assistant Examiner—Richard Gerard
Attorney, Agent, or Firm—Joel E. Siegel; Charles M. Kaplan

[57] ABSTRACT

The outlet valve of a container for fluids is suspended from such container by a spring-biased safety closure mechanism that is protected from damage and has an actuating mechanism that breaks away with the outlet valve on impact capable of causing the outlet valve to permit discharge of the contents of the container.

10 Claims, 4 Drawing Figures

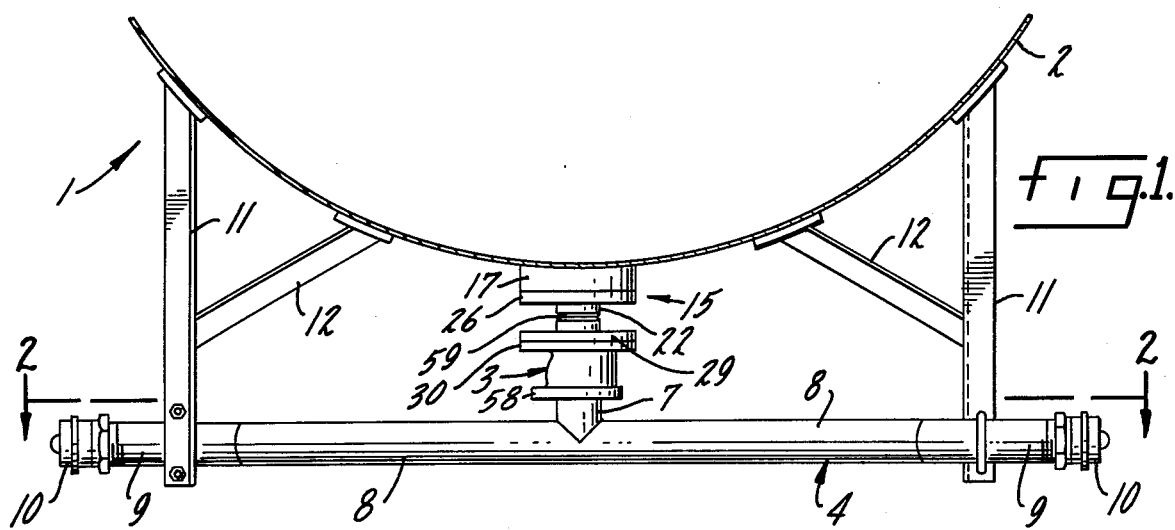
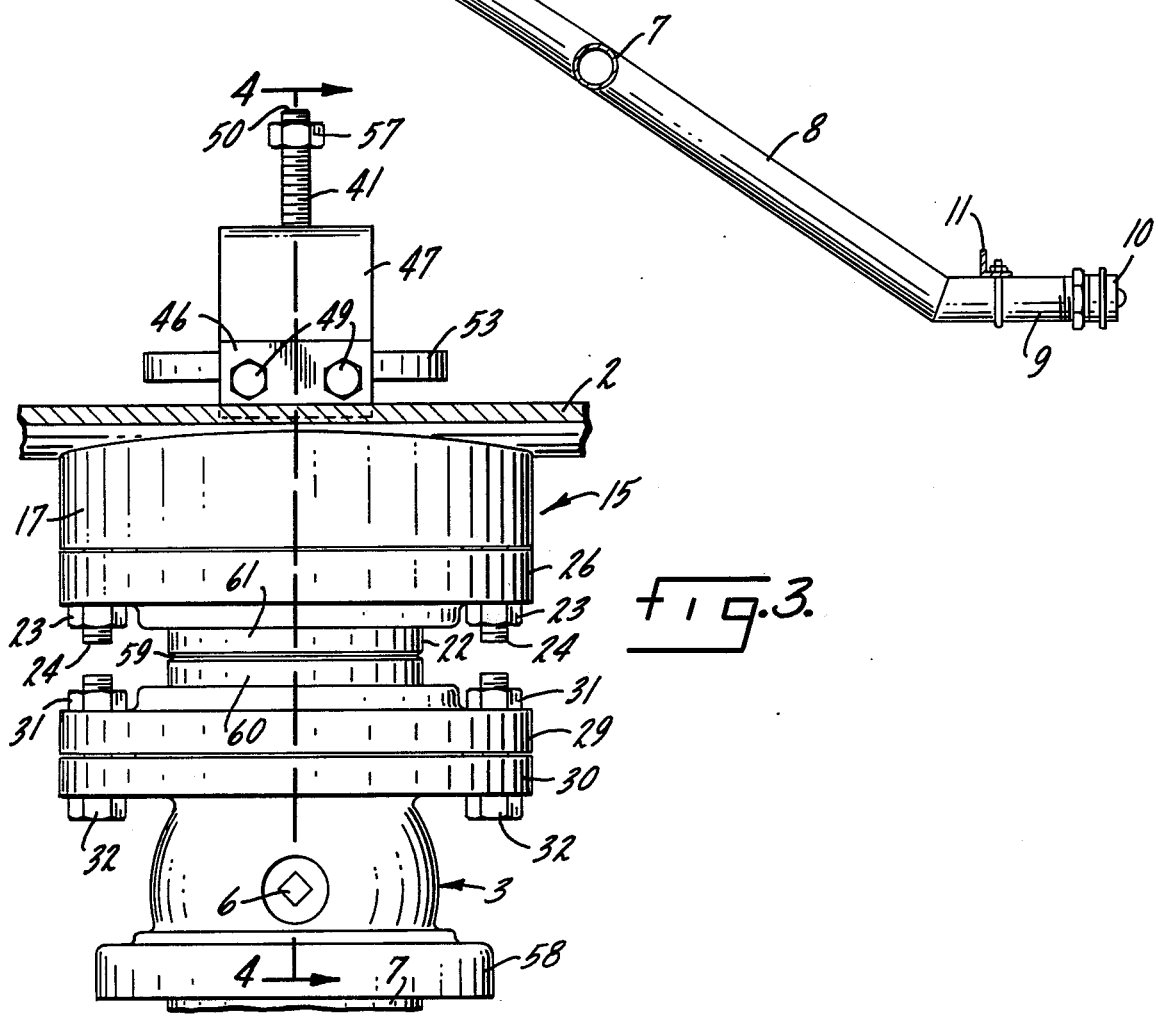

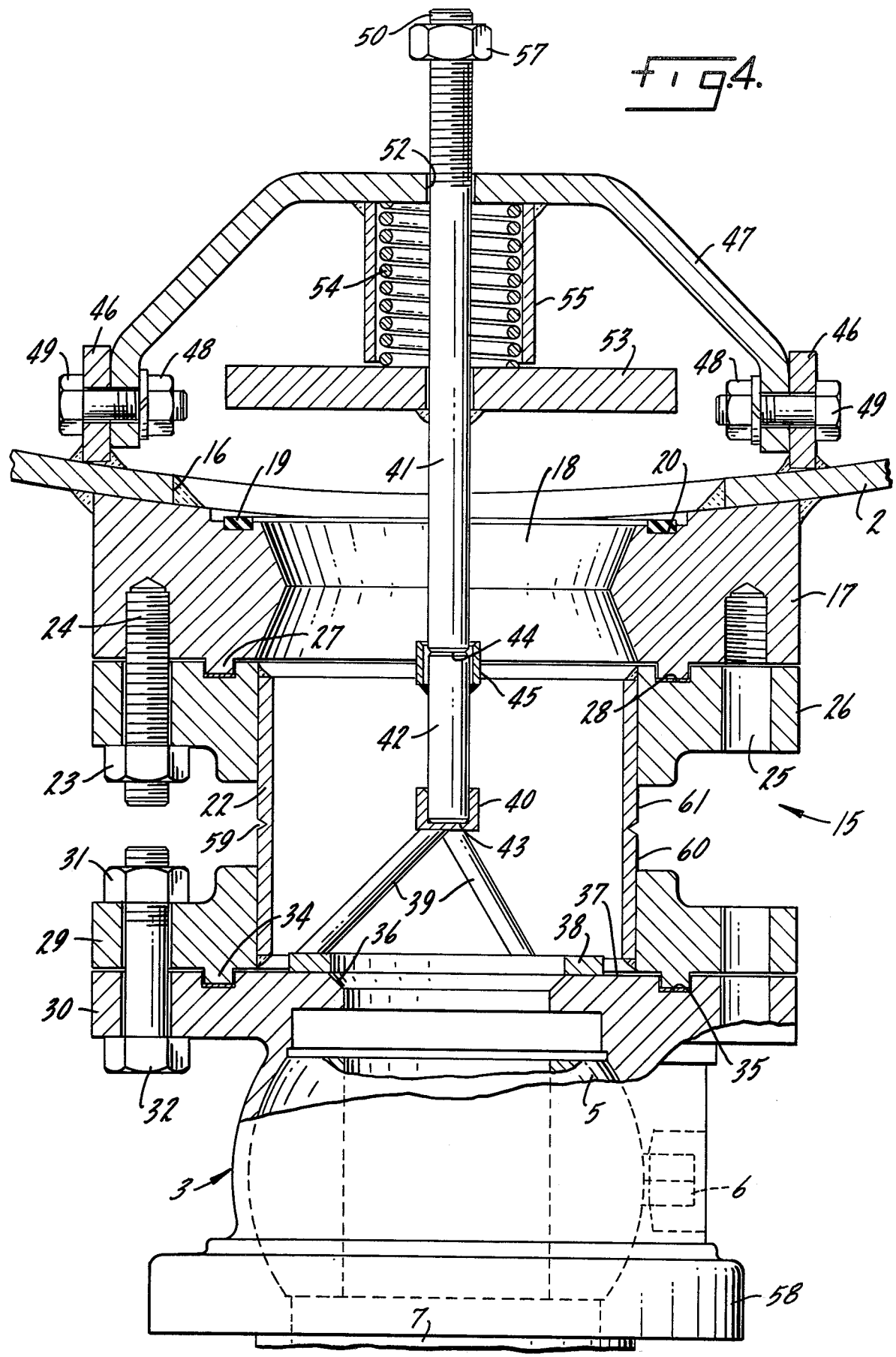

BOTTOM OUTLET SAFETY CLOSURE

BACKGROUND OF THE INVENTION

Derailment of a railroad tank car often causes loss of the contents of the car when the bottom outlet valve of the car is knocked off or severely damaged. It has not been possible to adequately protect a bottom outlet valve with a simple skid arrangement when the valve discharges through a tee that permits unloading from either side of the car. The arms of the tee are large surfaces exposed to the danger of impact, and these arms also function as levers increasing the forces that damage or shear off the valve. Also, malfunctioning of prior art safety devices can be caused by impact that occurs after such devices are triggered.

SUMMARY OF THE INVENTION

Accordingly it is an object of this invention to provide a safer railroad tank car for transporting fluids.

Another object is to provide a safety closure for railroad tank cars that can be unloaded from either side through bottom outlet valves.

Another object is to provide a safety closure device that is mounted on a tank in a manner that protects its parts from impact damage.

Another object is to provide a railroad tank car safety closure device that has a fracture groove which will trigger the device in case of derailment damage to the car outlet valve.

Another object is to provide a spring-biased safety closure mechanism for a tank that is actuated by breaking away of a valve that controls flow from the tank.

Another object is to provide a safety closure mechanism in which a two piece rod cocks the mechanism, and one piece of the rod separates on triggering to prevent malfunctioning or damage after the mechanism has been triggered.

Another object is to provide a safety closure arrangement for preventing escape of fluid from a railroad tank car that is strong, durable, easy to install and maintain, relatively low-cost, and which does not possess defects found in similar prior art devices.

Still other objects and advantages of the invention will be revealed in the specification and claims, and the scope of the invention will be set forth in the claims.

DESCRIPTION OF THE DRAWING

FIG. 1 is a schematic, partially broken-away end view of a portion of a railroad tank car in accord with this invention.

FIG. 2 is a bottom plan taken along the line 2—2 in FIG. 1.

FIG. 3 is an enlarged side view of a preferred embodiment of the safety closure for this invention.

FIG. 4 is a cross-sectional view taken along the line 4—4 in FIG. 3.

DESCRIPTION OF A PREFERRED EMBODIMENT

A railroad tank car 1 for transporting a fluid commodity such as a petroleum liquid or a liquified gas has a metal tank 2 for containing such fluid. Tank 2 may have any convenient shape, such as a right circular cylinder with its axis horizontal. Tank car 1 includes wheels and other conventional components such as couplers, draft gear, and an inlet for loading that do not form a part of this invention and hence are not shown in the drawing.

Tank 2 is unloaded through a bottom outlet valve 3 which discharges into unloading pipe 4 shaped like a crooked, upside-down T. Valve 3 is preferably a ball valve in which a truncated spherical ball 5 with a hole through its center is rotated by turning integral stem 6 until the hole is either aligned with its inlet and exit ports for discharge of fluid (as shown in FIG. 4), or sealed from the ports in conventional manner. The leg 7 of pipe 4 is coupled to the discharge port of valve 3. Skew arms 8 of pipe 4 extend toward opposite side of tank 2. Threaded end portions 9 extend perpendicular to the longitudinal axis of tank 2 and are closed by threaded caps 10. Thus the terminal ends of unloading pipe 4 are conveniently off-set on opposite sides of tank 2, and tank 2 can be unloaded from either side or from both sides at the same time. Pipe 4 is connected to tank 2 and supported by braces 11 and 12.

If tank car 1 is derailed or involved in any accident in which valve 3 or pipe 4 are subject to excessive impact forces, it is possible that valve 3 will be damaged to an extent that causes escape of the fluid in tank 2. To prevent such excape of fluid, tank car 1 is equipped with a safety closure device 15 in accord with this invention. The circular bottom outlet opening 16 in tank 2 is surrounded by metal reinforcing saddle 17 that is several times thicker than the metal from which tank 2 is made. Saddle 17 is welded to the outside surface of tank 2. A circular hole 18 passes through saddle 17. A pliable gasket 19 in a groove 20 surrounds hole 18 and faces toward the inside of tank 2 for sealing outlet opening 16.

A hollow tube 22 is connected to saddle 17 by nuts 23 threaded on to studs 24 which pass through apertures 25 in an upper flange 26 integral with tube 22. A circular tongue 27 on saddle 17 fits into a circular groove 28 on upper flange 26 so as to align the interior of tube 22 with hole 18. A lower flange 29 integral with tube 22 is connected to a flange 30 of valve 3 by nuts 31 threaded on to bolts 32 which pass through aligned apertures in flanges 29 and 30. A circular tongue 34 on flange 29 fits into a circular groove 35 on flange 30 so as to align the interior of tube 22 with the inlet port 36 of valve 3. A shoulder 37 on the top of valve 3 surrounds port 36 and faces the inside of tube 22. A perforated disc 38 rests on shoulder 37 and surrounds inlet port 36, with the perforation in disc 38 being approximately the same size as port 36. Three equally spaced bars 39 integral with disc 38 extend upwardly into tube 22 where their upper ends are attached to a cup 40.

A first relatively long rod segment 41 passes through the center of saddle 17 and then into tank 2. A second relatively short rod segment 42 butts end to end with rod 41 and passes through the center of tube 22. Cup 40 fits snugly around the lower terminal end 43 of rod 42 so that rods 41 and 42 push on disc 38 which is restrained from movement by shoulder 37. The lower end 44 of rod 41 is held in place by a sleeve 45 which is welded to the upper end of rod 42. Rod ends 43 and 44 and the entrance of cup 40 and sleeve 45 are beveled to facilitate entry and centering of rods 41 and 42. A pair of lugs 46 are welded to the inside of tank 2 adjacent outlet opening 16. A bracket 47 spans opening 16 and is attached to the inside of tank 2 by nuts 48 threaded on bolts 49 which pass through mating holes on bracket 47 and lugs 46. The threaded upper end 50 of rod 41 passes through a hole 52 in bracket 47. A safety closure plate 53 is welded to rod 41 between bracket 47 and outlet opening 16. The lower surface of plate 53 is shaped to seal against gasket 19 on actuation of safety device 15. A spring 54 is coiled around rod 41 between plate 53 and bracket 47 for forcing plate 53 against gasket 19. A collar 55 surrounds spring 54 and rod 41, and provides a stop for holding disc 53 and rod 41 in a predetermined position that would permit flow through opening 16 to equal or exceed the flow through valve 3 when spring 54 is compressed a proper amount. Collar 55 also limits upward movement of plate 53 so that if tank 2 is loaded through opening 16, inward flow of fluid can not force plate 53 so far upwardly that rod 41 could become unseated from sleeve 45 or rod 42 from cup 40.

To assemble safety device 15 from the inside of the tank 2, bracket 47 is removed from lugs 46 and spring 54 is compressed by threading a nut 57 on to rod end 50 and tightening nut 57 against the upper surface of bracket 47. This forces plate 53 against spring 54 until plate 53 contacts collar 55. Perforated disc 38 is dropped through hole 18 on to shoulder 37, and the lower end 43 of rod 42 is placed on cup 40. Then the lower end 44 of rod 41 is placed in sleeve 45, and bolts 49 are passed through the aligned openings in lugs 46 and bracket 47. Nuts 48 are tightened on bolts 49 to hold the assembly in place. Nut 57 is then removed from the end of rod 41, which causes spring 54 to force rod 41 firmly against rod 42. Valve 3 is connected to outlet pipe leg 7 in any conventional manner, such as by a threaded collar 58.

When valve 3, pipe 4, and braces 11 and 12 are subjected to an impact or other force sufficient to cause damage that would permit escape through valve 3 of the fluid in tank 2, a fracture groove 59 around the outside of tube 22 breaks, causing the lower portion 60 of tube 22 and attached valve 3 to separate from safety device 15. This removes the restraining effect of shoulder 37 on disc 38. This enables rod 41 and attached closure plate 53 to move under the force of compressed spring 54 until plate 53 seats against gasket 19, thus sealing outlet opening 16 and preventing escape of fluid. Sleeve 45 falls off the end 44 of rod 41, so rod 42 and disc 38 separate from safety device 15. The relative lengths of rods 41 and 42 are predetermined such that end 44 of rod 41 will be located just within the remaining or attached portion 61 of tube 22 after lower portion 60 of tube 22 breaks away. Thus, no part of remaining rod 41 can project beyond tube portion 61 or be subject to additional impact after safety device 15 is triggered.

It has thus been shown that a safety closure device in accord with this invention has its operating mechanism and sealing surfaces protected within tank 2 by enlarged metal saddle 17. Thus, safety device 15 can be damaged only by forces sufficiently large to rupture tank 2, in which case the fluid can not be prevented from escaping. The use of two rod segments 41 and 42, one of which falls away and one of which remains enclosed, provides supplementary protection after device 15 is triggered by preventing subsequent impact against remaining rod segment 41 for lifting closure plate 53 off of gasket 19 or otherwise damaging the device.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A safety device for preventing escape of a fluid from the outlet opening of a tank when a valve that normally regulates flow through said outlet opening is damaged, comprising: a saddle having a hole therethrough and being attached to the outside of said tank and surrounding said outlet opening, a gasketed surface on said saddle around said hole, a hollow tube connected to said saddle and aligned with said hole, said valve being connected to and aligned with said tube, a shoulder on said valve around the inlet port of said valve facing the inside of said tube, a perforated disc resting on and being restrained from movement by said shoulder and surrounding said inlet port, a rod connected to said disc and passing through said tube and said saddle and said outlet opening into said tank, a bracket attached to the inside of said tank and spanning said outlet opening, a safety closure plate for seating against said gasket attached to said rod between said bracket and said outlet opening, spring means between said plate and bracket for forcing said plate against said gasket, said rod normally maintaining said closure plate in an open position against the bias of said spring means, a fracture groove around said tube between said saddle and said shoulder for causing a portion of said tube connected to said valve and said valve to break away from said tank on impact capable of causing leakage from said tank by damaging said valve, the breaking away of said valve removing the restraining effect of said shoulder and enabling said perforated disc and rod to move under the force of said spring means so as to cause said closure plate to seat against said gasket and prevent escape of fluid from said tank.

2. The invention defined in claim 1 in which said rod comprises two segments, one of which separates after said safety device has been triggered.

3. The invention defined in claim 2 wherein the segment of said rod which separates is shorter than the remaining segment.

4. The invention defined in claim 3 wherein a sleeve on the upper end of said shorter rod segment receives the lower end of said remaining rod segment before said safety device has been triggered.

5. The invention defined in claim 3 wherein said remaining rod segment is protected within the remaining portion of said tube after said safety device has been triggered.

6. The invention defined in claim 1 wherein a hole through said bracket receives an end of said rod which is threaded.

7. The invention defined in claim 6 wherein a nut on the threaded portion of said rod projecting beyond said bracket is tightened against said bracket and thereby permits loading of said spring means from the inside of said tank.

8. The invention defined in claim 1 wherein a collar surrounds said spring means and provides a stop for said closure plate when said safety device is cocked.

9. The invention defined in claim 1 wherein said valve discharges into a T-shaped pipe, the arms of which extend toward opposite sides of said tank and permit unloading of said tank from either side.

10. A railroad tank car having a safety device for preventing escape of a fluid from its bottom outlet opening when a valve that normally regulates flow through said outlet opening is damaged, said valve discharging into a T-shaped pipe, the arms of said T-shaped pipe extending toward opposite sides of said tank car and permitting unloading of said tank car from either side, said safety device comprising: a saddle having a hole therethrough attached to the outside of said tank car and surrounding said outlet opening, a gasketed surface on said saddle around said hole, a hollow tube connected to said saddle and aligned with said hole, said valve being connected to and aligned with said tube, a shoulder on said valve around the inlet port of said valve facing the inside of said tube, a perforated disc resting on and being restrained from movement by said shoulder and surrounding said inlet port, a pair of rod segments connected to said disc and passing through said tube and said saddle and said outlet opening into said tank, a bracket attached to the inside of said tank and spanning said outlet opening, a hole through said bracket receiving an end of one segment of said rod which is threaded, a safety closure plate for seating against said gasket attached to said one rod segment between said bracket and said outlet opening, a spring coiled around said one rod segment between said plate and bracket for forcing said plate against said gasket, said pair of rod segments normally maintaining said closure plate in an open position, against to bias of said spring, a nut on the threaded portion of said one rod segment projecting beyond said bracket for tightening against said bracket and thereby permitting loading of said spring from the inside of said tank car, a collar surrounding said spring and providing a stop for said closure plate when said safety device is cocked, a fracture groove around said tube between said saddle and said shoulder for causing the portion of said tube connected to said valve and said valve to break away from said tank car on impact capable of causing leakage from said tank by damaging said valve, the breaking away of said valve removing the restraining effect of said shoulder and enabling said perforated disc and rod segments to move under the force of said spring so as to cause said closure plate to seat against said gasket and prevent excape of fluid from said tank car, the other of said rod segments being shorter than said one rod segment and separating after said safety device has been triggered, and said one rod segment being totally enclosed and protected within the remaining portion of said tube.

* * * * *